United States Patent

Marrs

[15] 3,666,701

[45] May 30, 1972

[54] COPOLYMER BONDING AGENT

[72] Inventor: Oren L. Marrs, Bartlesville, Okla.

[73] Assignee: Phillips Petroleum Company

[22] Filed: Sept. 1, 1970

[21] Appl. No.: 68,771

[52] U.S. Cl..............................260/27, 156/327, 260/33.6, 260/33.8, 260/876, 260/880, 260/887
[51] Int. Cl. ..........................................................C09j 3/26
[58] Field of Search ...............260/27, 880 B, 887, 876, 33.6, 260/33.8; 156/327

[56] References Cited

UNITED STATES PATENTS 3,557,252  1/1971  Hsieh et al. ............................260/880

3,557,255  1/1971  Sharkey..................................260/880

OTHER PUBLICATIONS

Skeist I " Handbook of Adhesives," 1962, (page 189).

*Primary Examiner*—Donald E. Czaja
*Assistant Examiner*—William E. Parker
*Attorney*—Young and Quigg

[57] ABSTRACT

Copolymer bonding agents comprising in combination resinous tackifiers, organic solvents, and a conjugated diene-lactone block copolymer, applied as a solution or dispersion to provide a pressure sensitive adhesive, a solvent cement, and a laminating adhesive.

9 Claims, No Drawings

COPOLYMER BONDING AGENT

This invention relates to a new copolymer bonding agent. In another aspect, this invention relates to a versatile new adhesive for bonding various surfaces together. In a more particular aspect of this invention, there is provided a copolymer bonding agent comprising a cementing or adhesive composition wherein the copolymer is represented by the formula A-B with A representing a block or polymer segment comprising polymerized conjugated dienes and B representing a block or polymer segment comprising polymerized lactones.

Many bonding and cementing compositions have been suggested in the art for bonding materials such as rubber, wood, metal, painted objects, plastics, paper, fabrics, and the like, to each other or to other surfaces. Various types of polymers have been suggested for use in adhesive recipes to accomplish these goals, but the majority of the polymers developed by the prior art have not been completely satisfactory, particularly in relation to creep resistance as well as other bonding characteristics. The art in the bonding or adhesive field is replete with compositions based on natural and synthetic materials, however, all of these bonding agents exhibit certain technical or economical limitations. In all cases, a balance must be struck between the aforementioned properties and total bonding agents costs.

One of the problems involved in the compounding of bonding agents relates not so much to the adhesive quality of the composition to a base such as paper, metal, plastic, etc., but on the contrary is concerned with the cohesive strength of material within its own body. Materials which are known in the adhesive art to impart high cohesive strength have deficiencies. Polymers may be permanently crosslinked as in cured epoxy resins or in post-vulcanized rubber adhesives, but the cost of raw materials and the need for special treatment before, during and after application often make this type of material undesirable. On the other hand, non-crosslinked polymers usually have little strength above their glass transition point and are hard and brittle below said point. Some materials do exhibit higher cohesive strength combined with flexibility, for example, Neoprene and polyamides, but the cost of these materials is undesirably above that of usual bonding agents.

It is an object of the present invention to provide an improved bonding agent. It is a particular object of this invention to provide improved pressure sensitivity, bonding agents through the utilization of conjugated diene-lactone block copolymers. Other objects of this invention are to provide improved sealants, caulking compounds, binders, rubber adhesives, adhesive coatings, bonding agents, solvent-based adhesives, mastics, tile cement, etc. Related objects of this invention comprise the provision of articles, tapes, and films as well as laminates bonded or coated with the bonding agent of the invention.

In accordance with this invention, a conjugated diene-lactone block copolymer, in admixture with a tackifier, is applied as a solution or dispersion to provide a pressure sensitive adhesive or solvent cement possessing good tack, peel strength, and creep resistance. Additionally, the formulations can contain conjugated diene polymers, as defined below.

The conjugated diene-lactone block copolymers that can be used in the process of this invention can be broadly represented by the formula A-B, wherein A represents a block or polymer segment comprising polymerized conjugated dienes and B represents a block or polymer segment comprising polymerized lactones. The B block comprises homopolymers of lactones or copolymers of two or more lactones and said lactone block or segment comprises about 10 to 90 weight percent of the total weight of said conjugated diene-lactone block copolymer. The A block thus comprises the remaining 90 to 10 weight percent of said conjugated diene-lactone block copolymer, and said A segment comprises homopolymer prepared from conjugated dienes, copolymer prepared from two or more conjugated dienes, or copolymer prepared from conjugated dienes and monovinyl-substituted aromatic hydrocarbons. When the A segment comprises a copolymer of conjugated dienes and monovinyl-substituted aromatic hydrocarbons, it is preferred that sufficient conjugated diene monomer be employed to provide a minimum of 10 weight percent of polymerized conjugated diene based on the total weight of said conjugated diene-lactone block copolymer. When the A block is a copolymer of conjugated dienes and monovinyl-substituted aromatic hydrocarbons, these monomers can be combined in a random or block manner. Thus, for example, the lactone polymer segment B can be attached to block A at a polymerized diene segment or a polymerized monovinyl-substituted aromatic hydrocarbon segment.

Conjugated dienes containing four to about 12 carbon atoms per molecule and monovinyl-substituted aromatic hydrocarbons containing eight to about 12 carbon atoms per molecule and monovinyl-substituted aromatic hydrocarbons containing eight to about 12 carbon atoms per molecule can be employed for preparing the conjugated diene-lactone block copolymers employed according to this invention. Suitable conjugated dienes include 1,3-butadiene, isoprene, piperylene, 6-phenyl-1,3-hexadiene, and the like, and mixtures thereof. Suitable monovinyl-substituted aromatic hydrocarbons include styrene, alpha-methylstyrene, 4-methylstyrene, 4-isopropylstyrene, 2,4-dimethylstyrene, 1-vinylnaphthalene, 2-vinylnaphthalene, and the like, and mixtures thereof.

Lactone monomers that can be employed in preparing the conjugated diene-lactone block copolymers for use in this invention can be represented by the formula

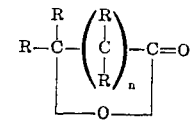

wherein each R is selected from hydrogen, alkyl, cycloalkyl, and aryl, and combinations thereof such as alkaryl, aralkyl, and the like, the total number of carbon atoms in all of said R substitutents being within the range of 0 to about 12, and wherein $n$ is an integer which can be 1, 3, or 4. Lactones which can be used include beta-propiolactone, delta-valerolactone, epsilon-caprolactone, and lactones corresponding to the following acids: 2-methyl-3-hydroxypropionic acid, 3-hydroxynonanoic acid, 2-dodecyl-3-hydroxypropionic acid, 2-cyclopentyl-3-hydroxypropionic acid, 3-phenyl-3-hydroxypropionic acid, 2-(1-naphthyl)-3-hydroxypropionic acid, 2-butyl-3-cyclohexyl-3-hydroxypropionic acid, 3-hydroxypentadecanoic acid, 2-(2-methylcyclopentyl)-3-hydroxypropionic acid, 2-o-tolyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-propyl-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, and the like. Mixtures of lactones can be employed.

Tackifiers which are useful in this invention can be any of the resinous substances known in the art for enhancing the tack of adhesive compositions. Examples of some suitable tackifiers include rosin; polymerized rosin, including dimerized rosin; dehydrogenated rosin; hydrogenated rosin esters of glycerol; hydrogenated rosin esters of pentaerythritol; hydrogenated rosin; esters of polymerized rosin and glycerol; maleic anhydride-modified rosin and rosin derivatives; coumarone-indene resins; partial esters of styrene-maleic acid copolymers; chlorinated biphenyls; oil-soluble phenolaldehyde resins; polyterpene resins, e.g., polymerized beta-pinene (from 100 percent rosin to 100 percent resin); and the like; and mixtures thereof.

The bonding agent of this invention should be dissolved or dispersed in an organic solvent prior to application to a surface. The solvent reduces the viscosity of the bonding agent and serves to wet the surfaces of the materials to be bonded together. Although any organic solvent which is inert toward the other components of the mixture can be used, the preferred solvents are saturated aliphatic, saturated cycloaliphatic, and aromatic hydrocarbons, e.g., pentane, 2-methylpentane, hexane, 3-ethylhexane, heptane, octane, nonane, naphtha, cyclopentane, methylcyclopentane, cyclohexane, methylcyclohexane, benzene, toluene, xylene, and the like. Other liquid organic solvents can be used, e.g., halogenated hydrocarbons, ethers, ketones, esters, and the like. Mixtures of any of the foregoing solvents can be used with the adhesive compositions of this invention. Although the amount of solvent is not especially critical, the solvent generally will be used in an amount such as to provide a solution or dispersion containing about 40 to 90, preferably 60 to 85, weight percent solvent.

If desired, a portion of the conjugated diene-lactone block copolymer in the bonding agent can be replaced with a conjugated diene polymer, as mentioned hereinabove, prepared without the use of a lactone as a comonomer. In this manner the properties of the bonding agent can be altered to make its use more versatile. Said conjugated diene polymers include homopolymers prepared from conjugated dienes, copolymers prepared from two or more conjugated dienes, and copolymers prepared from conjugated dienes and monovinyl-substituted aromatic hydrocarbons. Said conjugated diene polymers which are copolymers can be random, block, or graft copolymers. When said conjugated diene polymers are copolymers of conjugated dienes and monovinyl-substituted aromatic hydrocarbons, it is preferred that at least 10 weight percent of the polymer be derived from the conjugated diene monomer. Conjugated dienes and monovinyl-substituted aromatic hydrocarbons which are suitable as monomers for the preparation of said conjugated diene polymers include those disclosed hereinabove as suitable for preparing the conjugated diene-lactone block copolymers employed in this invention.

Although the weight ratio of said conjugated diene polymer to conjugated diene-lactone block copolymer in the bonding agent can be as high as 10:1, it usually will be not greater than 3:1.

The ratio of the combined weights of the conjugated diene-lactone block copolymer plus said conjugated diene polymer, if present, to the weight of tackifier generally is within the range of about 0.05:1 to 20:1, preferably being within the range of about 0.3:1 to 3:1.

EXAMPLE

Block copolymers of 1,3-butadiene and styrene and of 1,3-butadiene, styrene, and episilon-caprolactone were prepared as summarized in TABLE I.

TABLE II shows the inherent viscosity of polymers A, B, C, and D produced as described above, together with adhesive properties determined through use of formulations comprising these polymers. The adhesive formulations employed consisted of 1.5 parts by weight of polymer, 1.0 part by weight of Pentalyn H tackifier (hydrogenated rosin ester of pentaerythritol supplied by Hercules, Inc.), and 10.0 parts by weight of toluene. The tack, peel strength, and creep resistance were determined as follows:

TACK

A loop was formed from a 1-inch by 5-inch strip of the backing (Mylar film) coated with the pressure-sensitive formulation. The ends were brought together and taped with 1-inch masking tape. This formed a free loop of 3 inches with a 1-inch tab at the top. The loop was clamped by the tab in the upper jaw of an Instron testing machine. A 2.5-inch by 3-inch stainless steel plate for use as the substrate for the coated film, the plate mounted on the crosshead, was raised at a rate of 20 inches per minute until it had contacted an area of approximately 1 square inch of the tape loop. At this point the crosshead was reversed and moved away at the same rate. The time from initial contact to final break was about 6 seconds. Under the conditions of this test, the contact pressure exerted on the adhesive-substrate interface was extremely low, being of the order of 1.5 grams per square inch. The tack was measured at room temperature (about 25° C.) and expressed in pounds per inch width (ppiw).

PEEL STRENGTH

The method of ASTM D 1000–61 for pressure-sensitive adhesive insulating tape was used with slight modification. One-inch strips of adhesive-coated Mylar film were placed on 1.5 × 6-inch plates of the substrate and rolled once each way with a 4.5-pound rubber-coated roller. The strips were long enough that 5 to 6 inches extended past the end of the stainless steel substrate plate. After the film had remained on the substrate for 15–25 minutes, the free end was pulled back, exposing approximately 1 inch of the substrate. The exposed portion of the substrate was clamped in the upper jaw of an Instron testing machine, and the free end of the film was doubled back and clamped in the bottom movable jaw. The film was thus stripped at an angle of 180° and at a rate of 6 inches per minute (crosshead speed at 12 inches per minute). The force necessary to strip the approximate center 4 inches of the tape was determined at room temperature (about 25° C.) by visually averaging with a straight line the stress-strain curve obtained on the autographic chart recorder. The height of the center of the line was taken as the average peel strength, expressed in pounds per inch width (ppiw).

TABLE I
[Preparation of polymers, recipe, parts by weight]

| Polymer | 1,3-butadiene | Styrene | ε-Caprolactone | Cyclohexane | n-Butyllithium | Tetrahydrofuran | PAPI [a] | Epoxol 9-5 [b] |
|---|---|---|---|---|---|---|---|---|
| A [c] | 60 | 20 | 20 | 780 | 0.115 | 0.05 | 0.45 | 0 |
| B [c] | 50 | 25 | 25 | 780 | 0.115 | 0.05 | 0.45 | 0 |
| C [c] | 40 | 30 | 30 | 780 | 0.115 | 0.05 | 0.45 | 0 |
| D [d] | 60 | 40 | 0 | 800 | 0.14 | 0.05 | 0 | 0.5 |
| E [e] | 75 | 25 | 0 | 780 | 0.18 | 0 | 0 | 0 |

[a] Polymethylene polyphenylisocyanate having about three isocyanate groups per molecule and a molecular weight of about 380.
[b] Epoxidized linseed oil having an epoxy equivalent weight of about 162.
[c] Polymerizations were conducted by polymerizing the styrene in the presence of tetrahydrofuran and n-butyllithium in cyclohexane. After 0.5 hour at 70° C., the butadiene was added, and polymerization was allowed to continue for 0.5 hour at 70° C. ε-Caprolactone (0.3 part) was added, and the mixture was allowed to stand at room temperature for 16 hours. The remainder of the ε-caprolactone was then added, followed by addition of the PAPI. Polymerization was continued for 6.5 hours at 70° C., after which Cyanox SS antioxidant (one part per hundred parts polymer) was added, and the resulting polymer was isolated by alcohol coagulation and dried.
[d] Polymerization was initiated at 52° C. with only styrene, tetrahydrofuran, and n-butyllithium present in the cyclohexane diluent. The polymerization was allowed to continue for 20–23 minutes. 1,3-butadiene was then added, and polymerization was continued for 20–30 minutes, during which time the temperature peaked at 99–107° C. Epoxol 9–5 was added about 5–10 minutes after the peak temperature was reached. An antioxidant mixture of 0.5 part by weight of 2,6-di-tert-butylphenol and 1.5 parts by weight of tris(nonylphenyl)phosphite in admixture with 1 weight percent of triisopropanolamine was added, and the mixture was then steam stripped after 30–60 minutes additional reaction time.
[e] Polymerization was conducted by adding the n-butyllithium to the mixture of 1,3-butadiene, styrene, and cyclohexane, and maintaining the resulting mixture at 50° C. for 17 hours. A benzene solution containing 5 weight percent isopropyl alcohol and 2 weight percent N-phenyl-2-naphthylamine was then added, after which the solvent was removed to recover the polymer.

CREEP RESISTANCE

A 2-pound weight was hung from a vertical 1-inch-wide strip of adhesive-coated aluminum foil overlapped 1 square inch on the substrate. With the weight attached at an angle of 178° to the substrate, the time required for a ⅛-inch slippage of the adhesive bond at a given temperature was recorded and expressed in hours.

TABLE II

| Polymer | Polymer Inherent Viscosity[a] | Tack, ppiw | Adhesive Properties Peel Strength, ppiw | Creep Resistance, hours to failure at 125° C. |
|---|---|---|---|---|
| A | 1.80 | 3.7 | 2.8 | 2.0 |
| B | 1.72 | 0.7 | 3.6 | 3.0 |
| C | 1.98 | 0.2 | 3.4 | 4.0 |
| D | 1.28 | 0.1 | 3.5 | 3.0 |

[a]Determined in toluene at a concentration of 0.1 gram/100 ml. solvent and expressed in deciliters/gram.

As the data in TABLE II show, the use of adhesive formulations comprising polymers of epsilon-caprolactone (polymers A, B, and C) resulted in significantly higher values for tack than resulted through the use of a butadiene-styrene copolymer (polymer D) produced without the use of epsilon-carprolactone. Additionally, the peel strength and creep resistance obtained through use of the formulations comprising polymers A, B, and C were quite satisfactory. Thus, the overall adhesive properties obtained through use of these three formulations were superior to those obtained using the formulation comprising polymer D. The formulation comprising polymer D is outside the scope of this invention.

Additional tests were conducted to demonstrate the effect of replacing a portion of polymer A or B in the adhesive formulation with an equal amount by weight of polymer D or E, the adhesive formulations otherwise being as described above. Adhesive properties obtained through the use of these formulations are summarized in TABLE III, together with properties of formulations containing only one of polymers A, B, D, and E for comparative purposes. Also included are properties of a formulation, outside the scope of the invention and included for comparative purposes, differing in that equal amounts of polymers D and E were used. In each of the formulations the weight ratio of total polymer (A, B, D, and/or E) to tackifier to solvent was the same (1.5:1.0:10:0). Adhesive properties were determined as described above except that Mylar film instead of aluminum foil was used in those creep resistance determinations which were conducted at 85° C. or 52° C.

TABLE III

| Polymer | Tack, ppiw | Peel Strength, ppiw | Adhesive Properties Creep Resistance, hours to failure 85°C | 125°C |
|---|---|---|---|---|
| B+E | 2.2 | 4.5 | 26 | |
| B only | 0.7 | 3.6 | >46 | |
| E only | 0.7CF[a] | 0.7CF[a] | 1.5[b] | |
| A+D | 0.9 | 3.5 | | 2 |
| A only | 3.7 | 2.8 | | 2 |
| D only | 0.1 | 3.5 | | 3.0 |
| D+E | 0.5 | 5.5 | | 0.8 |

[a]CF = cohesive failure.
[b]At 52°C.

TABLE III shows that the adhesive properties of formulations comprising polymer A or B can be altered by substituting polymer D or E, each a butadiene-styrene copolymer, for a portion of polymer A or B. Thus, the formulation comprising polymers B and E provided higher tack than did the formulation without polymer E, at the same time providing relatively high creep resistance. TABLE III also shows that a formulation comprising polymers A and D provided higher tack than did the formulation without polymer A, at the same time providing satisfactory creep resistance. In contrast, when the formulation comprised polymers D and E instead of A and D, there was greater sacrifice in creep resistance.

An additional test was conducted to illustrate the utility of styrene-butadiene-epsilon-caprolactone polymers in solvent cements. Polymer A (1.33 parts by weight was mixed with Dymerex tackifier (dimerized rosin supplied by Hercules, Inc.; 1.00 part by weight) in toluene (9.33 parts by weight). The resulting formulation was brushed onto two pieces of canvas and allowed to dry briefly. While tacky, the two pieces of canvas were pressed together. The canvas-to-canvas laminate was allowed to dry 2 days at room temperature, the the T-peel strength was then determined by the method of ASTM D 1876–61T. The T-peel strength (canvas/canvas) was 31 pounds per inch width.

Having described the invention by providing specific examples thereof, it is to be understood that no undue limitations or restrictions are to be drawn therefrom, and many variations and modifications are within the scope of the invention.

What I claim is:

1. A copolymer bonding agent composition comprising:
    a. a block copolymer represented by the formula A—B with the A segment selected from the group consisting of homopolymers of conjugated dienes containing four to about 12 carbon atoms per molecule, copolymers prepared from two or more of the conjugated dienes, and copolymers of the conjugated dienes and monovinyl-substituted aromatic hydrocarbons containing eight to about 12 carbon atoms per molecule, the A segment comprising from 10 to 90 weight percent of the total weight of the block copolymer; the B segment comprised of polymerized lactones comprising from 10 to 90 weight percent of the total weight of the block copolymer, having the formula:

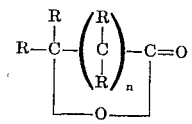

wherein each R is one of hydrogen, alkyl, cycloalkyl, aryl, alkaryl and aralkyl groups; and the total number of carbon atoms in all of the R substituents, is in the range of about 1 to 12, and $n$ is an integer which can be 1, 3, or 4;
    b. a resinous tackifier comprising from about 0.05:1 to 20:1 by weight of the combined weights of the conjugated diene-lactone block copolymer; and
    c. an organic solvent selected from the group consisting of saturated aliphatic, saturated cycloaliphatic, aromatic, and halogenated hydrocarbons comprising from about 40 to 90 weight percent of the resulting bonding agent.

2. A bonding agent according to claim 1 wherein the resinous tackifier selected from the group consisting of polymerized rosin, dehydrogenated rosin, hydrogenated rosin esters of glycerol, hydrogenated rosin esters of pentaerythritol, hydrogenated rosin, esters of polymerized rosin and glycerol, maleic anhydride-modified rosin; coumarone-indene resins; partial esters of styrene-maleic acid copolymers; chlorinated biphenyls oil-soluble phenol-aldehyde resins; polyterpene resins; and mixtures thereof.

3. A bonding agent according to claim 1 wherein the resinous organic solvent is selected from the group consisting of saturated aliphatic, saturated cycloaliphatic and aromatic hydrocarbons.

4. A bonding agent according to claim 1 wherein a portion of the conjugated diene-lactone block copolymer is replaced with a conjugated diene polymer providing a weight relationship of conjugated diene polymer to conjugated diene-lactone block copolymer of up to 10:1.

5. A composition according to claim 1 wherein the resinous block copolymer is comprised of 60 percent by weight 1,3-butadiene, 20 percent by weight styrene, and 20 percent by weight ε-caprolactone; with the composition consisting of 1.5 parts by weight of said block copolymer, 1.0 parts by weight hydrogenated rosin ester of pentaerythritol and 10 parts by weight toluene.

6. A composition according to claim 1 wherein the resinous block copolymer is comprised of 50 percent by weight 1,3-butadiene, 25 percent by weight styrene, and 25 percent by weight ε-caprolactone; said composition consisting of 1.5 parts by weight of block copolymer, 1.0 parts by weight hydrogenated rosin ester of pentaerythritol, and 10 parts by weight toluene.

7. A composition according to claim 1 wherein the resinous block copolymer is comprised of 40 percent by weight 1,3-butadiene, 30 percent by weight styrene, and 30 percent by weight ε-caprolactone; with said composition consisting of 1.5 parts by weight block copolymer, 1.0 parts by weight hydrogenated rosin ester of pentaerythritol and 10 parts by weight toluene.

8. A composition according to claim 1 wherein the block copolymer is comprised of 60 percent by weight 1,3-butadiene, 20 percent by weight ε-caprolactone; the composition consisting of 1.33 parts by weight of said block copolymer, 1.0 parts by weight dimerized rosin, and 9.33 parts by weight toluene.

9. A bonding agent according to claim 4 wherein the combined weights of the conjugated diene-lactone block copolymer plus said conjugated diene polymer in relationship to the weight of tackifier is from about 0.05:1 to about 20:1.

* * * * *

UNITED STATES PATENT OFFICE

CERTIFICATE OF CORRECTION

Patent No. 3,666,701          Oren L. Marrs          Dated: May 30, 1972

It is certified that error appears in the above-identified patent and that said Letters Patent are hereby corrected as shown below:

Column 6, line 68, before "organic" delete -- resinous --.

Column 7, line 1,
line 8,
line 15, after "the" delete -- resinous --.

Signed and sealed this 3rd day of October 1972.

(SEAL)
Attest:

EDWARD M. FLETCHER, JR.
Attesting Officer

ROBERT GOTTSCHALK
Commissioner of Patents